US 6,728,359 B1

(12) United States Patent
Jones et al.

(10) Patent No.: US 6,728,359 B1
(45) Date of Patent: Apr. 27, 2004

(54) NETWORK WITH DISTRIBUTED SERVICE CONTROL POINT FUNCTIONALITY

(75) Inventors: Matthew Jones, Ipswich (GB); Sandra D Berry, Colchester (GB); Francisco A De Carvalho, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/743,518

(22) PCT Filed: Aug. 4, 1999

(86) PCT No.: PCT/GB99/02563
§ 371 (c)(1),
(2), (4) Date: Jan. 11, 2001

(87) PCT Pub. No.: WO00/10342
PCT Pub. Date: Feb. 24, 2000

(30) Foreign Application Priority Data

Aug. 10, 1998 (GB) .............................................. 9817379
Dec. 8, 1998 (EP) .............................................. 98310056

(51) Int. Cl.[7] .......................... H04M 3/42; H04M 1/64; H04M 15/00; G06F 15/173
(52) U.S. Cl. ............................. 379/207.02; 379/88.23; 379/121.01; 709/224
(58) Field of Search .............................. 379/134, 88.23, 379/121.01, 207.02; 709/202, 224; 701/201

(56) References Cited

U.S. PATENT DOCUMENTS

| 5,136,636 | A | | 8/1992 | Wegrzynowicz | ....... 379/207.15 |
| 5,533,107 | A | | 7/1996 | Irwin et al. | ............ 379/201.05 |
| 5,661,791 | A | | 8/1997 | Parker | ................... 379/211.01 |
| 6,202,023 | B1 | * | 3/2001 | Hancock et al. | ............ 701/201 |
| 6,359,976 | B1 | * | 3/2002 | Kalyanpur et al. | ......... 379/134 |
| 6,363,411 | B1 | * | 3/2002 | Dugan et al. | ................ 709/202 |
| 6,389,117 | B1 | * | 5/2002 | Gross et al. | ............. 379/88.23 |
| 6,430,276 | B1 | * | 8/2002 | Bouvier et al. | ........ 379/121.01 |
| 6,470,386 | B1 | * | 10/2002 | Combar et al. | ............. 709/224 |

FOREIGN PATENT DOCUMENTS

| EP | 0559979 A2 | 9/1993 |
| WO | WO 98/28923 | 7/1998 |

OTHER PUBLICATIONS

Gawrys et al, "ISDN: Integrated Network/Premises Solutions" Integrating the World Through Communications, Toronto, Jun. 22–25, 1986, vol. 1, Jun. 22, 1986, pp. 1–5, XP002008867.

* cited by examiner

Primary Examiner—Ahmad F. Matar
Assistant Examiner—Thjuan P Knowlin
(74) Attorney, Agent, or Firm—Nixon & Vanderhye PC

(57) ABSTRACT

A telecommunications network for the automated switching of calls according to predefined user preferences has a plurality of computer platforms (100, 200, 300) at spaced locations, each platform including call receiving means (130, 230, 330), switch control means (120, 220, 320) for controlling the switching of incoming calls, and a Global data server (150, 250, 350) for maintaining real-time call destination status information. The switch control means of each platform is in communication with the Global data server of all of the other platforms. Call Destination Status information for a given user, is maintained on only one of the available Global data servers, with users being spread across the platforms to approximately equalise the loadings at each site. When an incoming call is received for a particular user, the switch control means arranges for it to be switched to a suitable destination, such as an Answer Centre, in dependence upon the original user preferences and the current real-time call destination status information; this may be maintained on one of the Global data servers at a site remote from that which has received the incoming call.

24 Claims, 1 Drawing Sheet

NETWORK WITH DISTRIBUTED SERVICE CONTROL POINT FUNCTIONALITY

BACKGROUND OF THE INVENTION

The present invention relates to a network with distributed service control point functionality, and in particular although not exclusively to such a server for use within an IN ("Intelligent Network") environment. Intelligent Network architecture and standards are in use by many telecommunications throughout the world. Typically, each Intelligent Network includes a plurality of Service Control Points (SCPs) which executes the IN services. SCPs are typically centralised computing platforms which interface both to Intelligent Peripherals, and also to the underlying core network. Problems may arise, however, with both accuracy and scalability where service features are required to be shared by multiple SCPs, of the same manufacturer or otherwise. The problem may be particularly acute where individual SCPs are of differing kinds and/or are made by different manufacturers.

BRIEF SUMMARY OF THE INVENTION

According to the present invention there is provided a telecommunications network for the automated switching of calls according to predefined user preferences, the network including a plurality of computer platforms, at spaced locations, each platform including:

(a) call receiving means for receiving incoming calls;

(b) switch control means for controlling the switching of incoming calls; and (c) a global data server, in communication with the switch control means, for maintaining real-time call destination status information;

the switch control means of each platform also being in communication with the global data server of at least one other platform; and the switch control means being arranged to control switching of an incoming call for a given user according to the user preferences for the given user and according to information on real-time call destination statuses received from a given one of the global data servers on which information for the given user is maintained.

By maintaining real-time call destination status information for a given user on exactly one of the global data servers, the load across the entire telecommunications network may be spread fairly evenly across the plurality of computer platforms. The global data servers implement a distributed service control point functionality making it possible for resources required globally to be shared by many services and Intelligent Network (IN) platforms in real time.

The information maintained on the global data servers is updated in real time, preferably by means of a message sent by the switch control means whenever a connection is made and whenever a connection is broken. Such an arrangement avoids the use of large conventional database systems which, because of the overhead involved, typically cannot be updated in real time. It is to be understood, of course, that in this specification and the claims the expression "real time" does not necessarily preclude a delay between the connection being made and the information on the global data server being updated. Some sort of delay is naturally inevitable, merely from the physical constraints of the system, and in some cases update requests may even have to be buffered for a short period. Nevertheless, a clear distinction has to be made between the "real time" system of the present invention, in which the information is updated, as rapidly as may be, on a call-by-call basis, and a conventional database system in which updates are typically carried out on a bulk basis, perhaps once a day.

The call destination status information which is maintained by the global data servers may include (but is not restricted to) call-in-progress count information for each of the potential call destinations (one particular type of which may be an Answer Centre) for a given user. In the preferred embodiment, the switch control means may check with the global data server appropriate for that user whether it can be permitted to transfer an incoming call to its preferred Answer Centre. The global data server checks whether the calls-in-progress count is lower than the maximum permitted for that particular Answer Centre, and if so returns a signal to the switch control means permitting the connection to be made. If on the other hand the calls-in-progress count for that Answer Centre has already reached the maximum permitted, the global data server may return a signal indicating to the switch control means that the proposed connection is not permitted, or alternatively may indicate that the connection is queued. The switch control means may then refer to the predefined user preferences, to see whether the call should be connected to another Answer Centre. If so, it makes a similar request to the global data server in connection with that Answer Centre. Eventually, the incoming call is either connected with an available Answer Centre, or the global data server has denied access to all possible Answer Centres, in which case the switch control means refers to the user preferences to decide what action to take next: typically, to transfer the incoming call either to a recorded voice announcement, to supply the caller with the "busy tone", or to use an alternative service logic to formulate the call.

Each switch control means has access to the predefined user preferences, which may preferably be stored as a computer file, or in memory. Preferably, multiple copies of the user preferences for each of the users are stored on a corresponding plurality of user-preference servers, one on each of the computer platforms. In the preferred embodiment, the user preference servers may comprise data servers. By disseminating copies of the user preferences to each of the platforms, the switch control means may obtain the information they need rapidly, without needing to overload a central database. Each of the user preference servers desirably receives information from a central user front end server, on a regular basis, specifying whether any changes have been made to the master copy of the user preferences. In one preferred arrangement, each user preference server is automatically updated as and when a change occurs. When the invention is used on a BT network, the preferred embodiment of the user preference server is BT's Major Customer Service System.

Each switch control means may maintain in memory a list of all known users of the system, along with the address of or a mapping to the global data server on which the call destination status information for that user may be found. In that way, requests for call destination status information for a given user may rapidly be addressed to the correct global data server, whether that server happens to be on the same or on a different platform from the requesting switch control means.

The information is preferably maintained on the global data servers in an object-oriented format, and each of the servers is arranged to auto-create a new object if a switch control means communicates to it details of an object which it does not previously know about. For example, if a request is made of a global data server which refers to a presently unknown user, a record for that user is automatically created. Similarly, a record for a call destination is automatically created if the global data server receives a request which refers to a currently unknown call destination.

Desirably, the global data servers do not need to know, neither do they care, where a particular request for information has come from. They are arranged to respond to any request, from anywhere, which has been made in the correct format. Such an arrangement provides location transparency, and enables the system to share services very effectively. Indeed, the global data servers need not be restricted to responding to requests from a single service provider: they could be shared between service providers, or at least made accessible to a number of different service providers. This would have the advantage that a single Answer Centre could, if required by the user, receive calls via a number of different service providers. To put it another way, the global data server does not know, or care, which customers, Answer Centres or Proportional Call Distribution Tables it has to work with, nor which Advanced Transaction Server a message has come from.

The user may wish automatically to spread the incoming calls between a variety of different Answer Centres, with the number of calls going to each Answer Centre possibly varying with time. This may be achieved by allowing the user to specify user-defined weightings within the user preferences, the switch control means then being arranged to distribute the incoming calls between the selected call destinations according to those weightings.

When a request is made of a global data server, the server may return, along with other information, control rate information indicating the rate at which the server is currently receiving requests. That control rate information may then be used by the switch control means, which may vary its mode of operation in dependence upon the control rate information. For example, the user preferences may specify that if the global data server is becoming overloaded, future incoming calls should be directed elsewhere, for example to an Intelligent Peripheral which may provide an automated answering service. In one preferred embodiment, when the global data server is overloaded, calls to it are sent to an "All Busy" branch on the user's call plan.

BRIEF DESCRIPTION OF THE DRAWING

The invention may be carried into practice in a number of ways and one specific embodiment will now be described, by way of example, with reference to the accompanying drawing, in which:

DETAILED DESCRIPTION OF EXEMPLARY EMBODIMENTS

Figure 1:
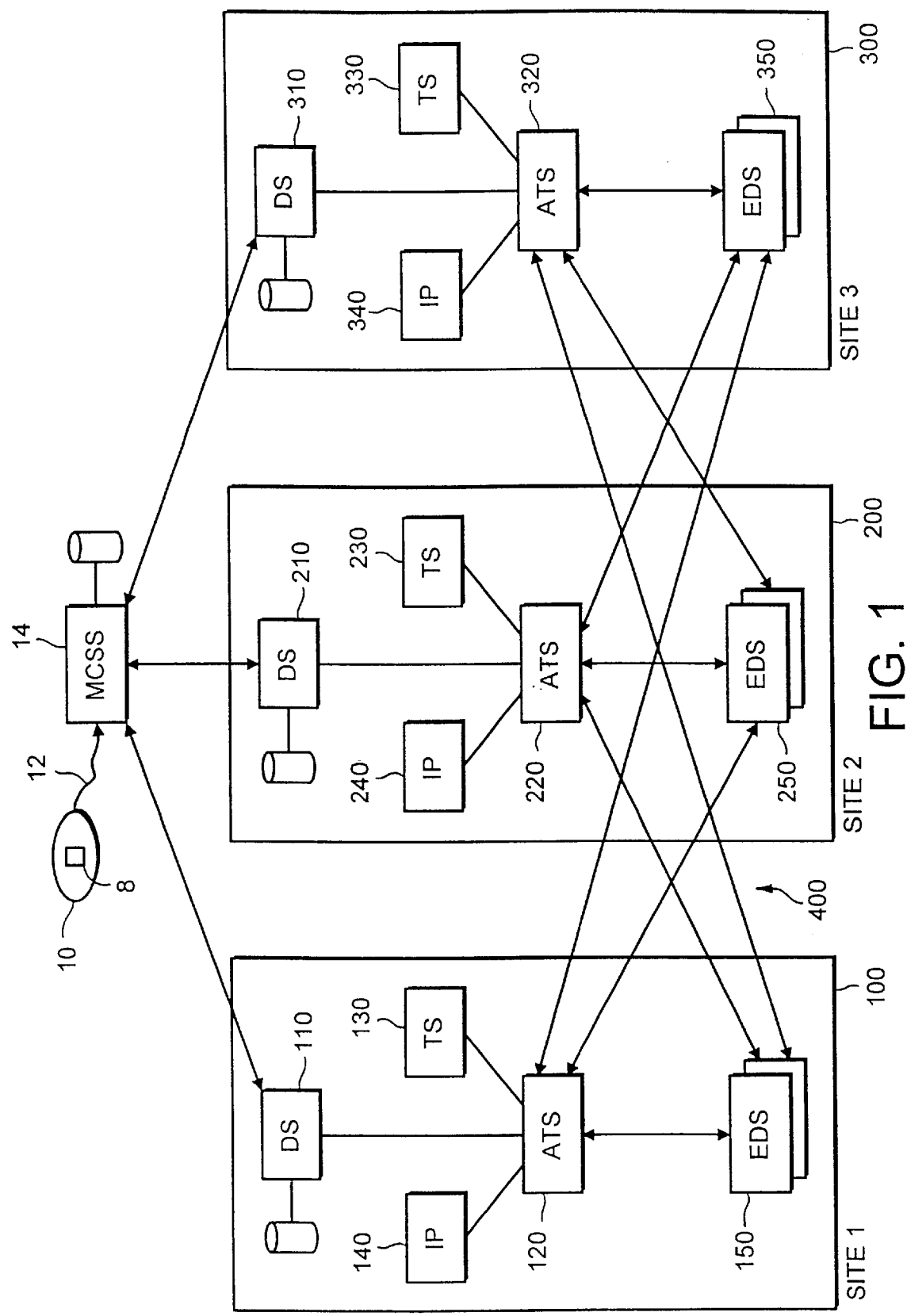

FIG. 1 is a schematic diagram showing the use of a global data server (GDS) in conjunction with a Network Intelligent Platform (NIP).

The Network Intelligent Platform (NIP) is primarily designed to provide telemarketing services, for example for customers who wish to maintain a national presence using a single "free-phone" number. Incoming calls to the customer, on that number, may automatically need to be switched to the customer's Answer Centres (ACs), each of which may be located in a different area of the country.

The way in which this may be achieved, in accordance with the preferred embodiment of the invention, is illustrated schematically in FIG. 1. This makes use of the Network Intelligent Platform (NIP), to be described in more detail below.

The customer makes use initially of his own computers 8, at his own premises 10 to set up and edit his own "call plan"—a graphical representation of the services to be offered. A particular customer may, for example, want to distribute incoming calls to three separate Answer Centres, according to the time of day, day of week and so on. The call plan may also specify the maximum number of calls that can be taken at any one time by each Answer Centre, and what is to happen if more calls are received than can be handled. Once the plan has been set up, and appropriately edited using suitable graphical software, the plan is then uploaded via the PSTN 12 to the service providers customer front end 14. Within BT, for example, the front end 14 comprises the Management Customer Service System (MCSS): see BT Technology Journal, vol 15, No 1 January 1997, p81. The plan is then stored on a database within the MCSS.

IN services are provided by a Network Intelligent Platform (NIP), the function of which is to execute the customer's call plan stored on the MCSS 14. In practice, of course, there may be numerous customers, each having one or more call plans, all of which need to be acted upon simultaneously. In the embodiment of FIG. 1, the NIP comprises a collection of hardware and software which is replicated at various centres around the country, specifically in the embodiment shown at Site1 100, Site2 200 and Site3 300.

At each site, the computer hardware consists of a Data Server (DS) 110, 210, 310, an Advanced Transaction Server (ATS) 120, 220, 320, a Transaction Server (TS) 130, 230, 330, an Intelligent Peripheral (IP) 140, 240, 340, and a Global data server (GDS) 150, 250, 350. The TS acts as a call receiving means, and the ATS as a switch control means.

The operation of the NIP will now be described, for simplicity just with reference to Site1 100. The system operates identically, and in parallel, at Site2 and at Site3. The sites may be spread across the country.

The DS 110 regularly receives updates from the MCSS database 14, and maintains its own copy of the customer's call plan. An incoming call for that particular customer arrives (as is usual within an Intelligent Network) at the TS 130, which first determines whether this call is a "intelligent call" or not. If so, in other words if the call is capable of being handled by the Intelligent Network, the TS passes the call on to the ATS 120. This then determines how the call is to be routed, based upon the stored plan within the DS. Once that determination has been made, the ATS instructs the switched network (not shown) to direct the call to the chosen Answer Centre (AC) (not shown). Alternatively, the ATS may need to pass the call on to the Intelligent Peripheral (IP) 140; this can provide such functionality as voice announcements, background music, a busy tone and so on.

In order to instruct the routing of the call correctly, according to the customer's call plan, the ATS 120 has to find out the status of the call destination (typically an Answer Centre) that it wishes to direct the call to. It does this by querying the GDS 150.

The GDS maintains in memory a real time count of the number of calls that are currently in progress at each of the Answer Centres specified in the call plan. When the ATS wishes to send a call to a particular Answer Centre, it first compares the Calls In Progress (CIP) count for that Answer Centre with the maximum number of simultaneous calls permitted under the call plan. The list may for example be made out as follows:

| Customer 1 | |
|---|---|
| Answer Centre | Index |
| AC1 | 20 |
| AC2 | 21 |
| AC3 | 36 |
| . | . |
| . | . |
| . | . |

If the maximum number of calls has not yet been reached, the ATS may route the call to that Answer Centre accordingly; on the other hand, if the maximum number of calls for that Answer Centre has already been reached, the ATS refers back to the call plan which may direct that the call be sent to another Answer Centre elsewhere; the process may then be repeated, as set out in the call plan, with checks being made of a number of different Answer Centres in an effort to find one which is capable of taking the call.

Once an appropriate Answer Centre has been found, the ATS sends the call to that Answer Centre and instructs the GDS to update its real time CIP count to reflect the additional call which is now in progress at that Answer Centre. When the call is eventually terminated, the TS sends notification of the termination to the ATS which itself advises the GDS. The CIP count for that Answer Centre is then decremented. In that way, the list held in memory within the GDS acts as a real time CIP count for each Answer Centre, without the need for the GDS to maintain any database.

In a practical environment, there will of course be multiple lists held by the GDS, each list being specific to a specific customer and to a specific call plan for that customer.

In one embodiment, the lists applicable to a specific customer are maintained within a single one of the three available GDS computers 150, 250, 350. By allocating a new customer specifically to Site1 or to Site2 or to Site3, the service provider can improve scalability by arranging for the loadings on each site to be similar. The allocation of individual customers to specific sites is, however, not essential and indeed such allocation is not made in the currently preferred embodiment A network of connections 400 between the sites allows each ATS 120, 220, 320 to interrogate any of the GDSs, regardless of the site. Of course, each ATS has to know which GDS to interrogate, and to that end it stores in memory a list of customers along with the identity of the GDS to be interrogated in each case. There is therefore no difficulty, for example, if an incoming call for a particular customers arrives at TS 130 on Site1, when the CIP lists for that customer are stored on GDS 350 at Site3; the ATS simply checks its customer list for that customer, and sends the request to the appropriate GDS on the list, in this case the GDS 350. Once the Answer Centre has been selected, according to the customer's call plan, the CIP for that Answer Centre is incremented within the list held on the GDS 350; once the call is completed, the CIP count is decremented.

A further feature of the preferred embodiment is the ability to provide Proportional Call Distribution (PCD). This allows the customer to "weight" each Answer Centre according to the number of agents that are available at that Answer Centre; incoming calls may then be switched to the various Answer Centres in proportion to the weights that have been set. Other nodes on the network may likewise be given user-defined "weightings".

In operation, the customer first sets the AC weights within the call plan; for example 60% for AC1 and 20% for each of AC2 and AC3. The ATS builds a table in memory based on the call plan, as follows:

| Customer 1; PCD 1 | |
|---|---|
| Answer Centre | Index |
| AC1 | 1 |
| AC1 | 2 |
| AC2 | 3 |
| AC3 | 4 |
| AC1 | 5 |
| . | . |
| . | . |
| . | . |

The right hand column is simply a sequential index, and the left hand column contains repeated entries for each of the Answer Centres, the number of repetitions depending upon the weight that has been selected by the user.

The ATS simply works through the table sequentially, with the first call going to the Answer Centre opposite Index 1, the second to the Answer Centre opposite Index 2 and so on. The current (or the next) value of the index is maintained in memory by the GDS. When an incoming call is received, the ATS then asks the GDS for the next index number, and attempts to route the call to the appropriate Answer Centre specified in the table.

In a further development, customers may wish to alter their proportional call distributions according to time of day, day of week etc. That can be dealt with by maintaining a number of different PCD tables for each customer, with the appropriate table being chosen according to the rules set out in the call plan. With such an arrangement, there is of course a need for the GDS to maintain several different index values for each of the PCD tables. The GDS therefore maintains, in memory, a table similar to the following:

| Customer 1 | |
|---|---|
| PCD | Next index |
| PCD1 | 1 |
| PCD2 | 4 |
| PCD3 | 5 |
| . | . |
| . | . |
| . | . |

In that table, PCD 1 represents the first PCD table for that customer, PCD 2 the second, and so on. In the preferred embodiment, each PCD table is known as a PCD "node".

The system employs a hand shaking protocol between the ATS and the GDS to ensure that the GDS does not become overloaded, even when large numbers of calls are being received. This is achieved by including in each GDS response to the ATS a "control rate", which the ATS can act on to slow the flow of requests, should that prove necessary. This allows the ATS to control calls on the basis of the call plan: for example, if the GDS that a particular ATS needs is becoming overloaded, the call plan could specify that a certain proportion of the calls are to be passed to the IP 40, with the callers receiving either a recorded message or a "busy" tone.

The messaging protocol used by the GDS to receive requests, and to return information to the ATS is designed so that the GDS need have no knowledge of which ATS is using it, or where that ATS is situated. When the GDS is initially booted up, it has no a priori knowledge of the NIP, and is arranged to auto-create entries in memory as and when the need arises. For example, when a new customer is introduced, the GDS automatically creates a new customer object on the first occasion that a request is received relating to that customer. Likewise, the GDS has no a priori knowledge of Answer Centres, and Answer Centre objects are also automatically created, as needed. When the properties of an object change (for example when the maximum number of calls that can be received by an Answer Centre changes) the objects properties are automatically updated in GDS memory.

Such an arrangement provides for "boot-strap" operation, and eliminates the need for a GDS database. Instead, object attributes both for creation and update are contained within the received message. The fact that the GDS does not care which ATSs, ACs or PCDs it has to work with provides for location transparency.

The GDS arrangement shown in FIG. 1 implements a distributed service control point functionality making it possible for resources which are required globally to be shared by many services and IN platforms in real time. The GDSs may work across multiple service providers, and could provide information not only to the Network Intelligent Platform (NIP), but also to other service providers making use of the same messaging protocol. In such a way, several service providers could make use of the same Answer Centres.

What is claimed is:

1. A telecommunications network for the automated switching of calls according to predefined user preferences, the network including a plurality of computer platforms, at spaced locations, each platform including:
   (a) call receiving means for receiving incoming calls;
   (b) switch control means for controlling the switching of incoming calls; and
   (c) a global data server, in communication with the switch control means, for maintaining real-time call destination status information including a list of call-in-progress counts for each of a plurality of call destinations specified by a given user;
   the switch control means of each platform also being in communication with the global data server of at least one other platform; and
   the switch control means being arranged to control switching of an incoming call for the given user according to the user preferences for the given user and according to information on real-time call destination statuses received from a given one of the global data servers on which information for the given user is maintained.

2. A telecommunications network as claimed in claim 1 in which information for the given user is maintained on exactly one of the global data servers.

3. A telecommunications network as claimed in claim 1 in which each platform further includes a user preferences server, in communication with the switch control means, for storing the predefined user preferences for a plurality of users.

4. A telecommunications network as claimed in claim 3 in which each user preferences server stores an identical copy of the said predefined user preferences.

5. A telecommunications network as claimed in claim 4 including a user front-end server for maintaining a master copy of the said predefined user preferences, of which the said identical copies are duplicates.

6. A telecommunications network as claimed in claim 5 including user-actuable upload means enabling a user to upload his user preferences, or a modification to them to the user front-end server.

7. A telecommunications network as claimed in claim 1 in which the given global data server increments the call-in-progress count for a specific call destination when the switch control means switches to an incoming call to the said specific call destination; and in which it decrements the count when the said call is completed.

8. A telecommunications network as claimed in claim 1 in which each switch control means maintains a record of the users which are associated with each of the global data servers, so that requests for call destination status information for a given user may be addressed to the correct global data server.

9. A telecommunications network as claimed in claim 1 in which each global data server is arranged to maintain call destination status information in an object-oriented format, and is arranged to autocreate a new object if a switch control means communicates to it details of an object not previously known about.

10. A telecommunications network as claimed in claim 9 in which users and call destinations are maintained as objects.

11. A telecommunications network as claimed in claim 1 in which the switch control means is arranged to distribute calls between selected call destinations according to user-defined weightings within the user preferences.

12. A telecommunications network as claimed in claim 11 in which the switch control means maintains a list of call destinations, to be tried sequentially by the switch control means as destinations for sequential incoming calls for the given user.

13. A telecommunications network as claimed in claim 12 in which the switch control means requests instructions from the given global data server whenever the list is to be referred to, the global data server returning an index value which informs the switch control means of the required list access address; the global data server then incrementing the index value in readiness for the next request.

14. A telecommunications network as claimed claim 11 in which there are a plurality of user-defined weightings within the user preferences, to be selected according to user-defined rules.

15. A telecommunications network as claimed in claim 14 when dependent upon claim 14 in which the given global data server maintains a plurality of index values, one for each of the user-defined weightings.

16. A telecommunications network as claimed in claim 1 in which each global data server returns control rate information indicating the rate at which it is currently receiving requests.

17. A telecommunications network as claimed in claim 16 in which each switch control means is arranged to vary its mode of operation in dependence upon the control rate information.

18. A computer platform including:
   a call receiving means for receiving incoming calls;
   a global data server for maintaining real-time call destination status information including a list of call-inprogress counts for each of a plurality of call destinations specified by a given user; and a switch control means arranged to automatically switch incoming calls and to communicate with said global data server and to communicate with at least one other global data server provided by another computer platform, the switch control means arranged to automatically switch incoming calls according to information comprising:

a set of preferences predefined by a user; and real-time call destination status information provided by a global data server on which information for the user is maintained taken from the group consisting of said global data server and said at least one other global data server.

19. A telecommunications network including a plurality of computer platforms at spaced locations, each computer platform including:

a call receiving means for receiving incoming calls;

a global data server for maintaining real-time call destination status information including a list of call-in-progress counts for each of a plurality of call destinations specified by a given user; and a switch control means arranged to automatically switch incoming calls and to communicate with said global data server and to communicate with at least one other global data server provided by another computer platform in said telecommunications network, the switch control means arranged to automatically switch incoming calls according to information comprising:

a set of preferences predefined by a user; and real-time call destination status information provided by a global data server on which information for the user is maintained taken from the group consisting of said of global data server and said at least one other global data server.

20. A method of proportioning call distribution between a number of selected call destinations in a telecommunications network, wherein the network includes a plurality of computer platforms at spaced locations, each computer platform including: a call receiving means for receiving incoming calls; a global data server for maintaining real-time call destination status information; and a switch control means arranged to automatically switch incoming calls and to communicate with said global data server and to communicate with at least one other global data server provided by another computer platform included in said telecommunications network, the switch control means arranged to automatically switch incoming calls according to information comprising: a set of preferences predefined by a user; and real-time call destination statuses provided by a global data server on which information for the user is maintained taken from the group consisting of said of global data server and said at least one other global data server, wherein the method comprises the steps of:

the user specifying user-defined weightings within the set of preferences;

the switch control means distributing incoming calls between said selected call destinations according to said user-defined weightings; and the global data server maintaining a list of call-in-progress counts for each of a plurality of call destinations specified by a given user.

21. A telecommunications network for the automated switching of calls according to predefined user preferences, the network including a plurality of computer platforms, at spaced locations, each platform including:

(a) call receiving means for receiving incoming calls;

(b) switch control means for controlling the switching of incoming calls; and (c) a global data server, in communication with the switch control means, for maintaining real-time call destination status information including a list of call-in-progress counts for each of a plurality of call destinations specified by a given user, said list of call-in-progress counts being globally accessible;

the switch control means of each platform also being in communication with the global data server of at least one other platform; and the switch control means being arranged to control switching of an incoming call for the given user according to the user preferences for the given user and according to information on real-time call destination statuses received from a given one of the global data servers on which information for the given user is maintained.

22. A computer platform including:

a call receiving means for receiving incoming calls;

a global data server for maintaining real-time call destination status information including a list of call-in-progress counts for each of a plurality of call destinations specified by a given user, said list of call-in-progress counts being globally accessible; and a switch control means arranged to automatically switch incoming calls and to communicate with said global data server and to communicate with at least one other global data server provided by another computer platform, the switch control means arranged to automatically switch incoming calls according to information comprising:

a set of preferences predefined by a user; and real-time call destination status information provided by a global data server on which information for the user is maintained taken from the group consisting of said global data server and said at least one other global data server.

23. A telecommunications network including a plurality of computer platforms at spaced locations, each computer platform including:

a call receiving means for receiving incoming calls;

a global data server for maintaining real-time call destination status information including a list of call-in-progress counts for each of a plurality of call destinations specified by a given user, said list of call-in-progress counts being globally accessible; and a switch control means arranged to automatically switch incoming calls and to communicate with said global data server and to communicate with at least one other global data server provided by another computer platform in said telecommunications network, the switch control means arranged to automatically switch incoming calls according to information comprising:

a set of preferences predefined by a user; and real-time call destination status information provided by a global data server on which information for the user is maintained taken from the group consisting of said of global data server and said at least one other global data server.

24. A method of proportioning call distribution between a number of selected call destinations in a telecommunications network, wherein the network includes a plurality of computer platforms at spaced locations, each computer platform including: a call receiving means for receiving incoming calls; a global data server for maintaining real-time call destination status information; and a switch control means arranged to automatically switch incoming calls and to communicate with said global data server and to communicate with at least one other global data server provided by another computer platform included in said telecommunications network, the switch control means arranged to automatically switch incoming calls according to information comprising: a set of preferences predefined by a user; and real-time call destination statuses provided by a global data server on which information for the user is maintained taken from the group consisting of said of global data server and said at least one other global data server, wherein the method comprises the steps of:

the user specifying user-defined weightings within the set of preferences;

the switch control means distributing incoming calls between said selected call destinations according to said user-defined weightings; and the global data server maintaining a list of call-in-progress counts for each of a plurality of call destinations specified by a given user, said list of call-in-progress counts being globally accessible.

* * * * *